(12) United States Patent
Iwata et al.

(10) Patent No.: US 12,485,932 B2
(45) Date of Patent: Dec. 2, 2025

(54) TRAVELING RAIL AND ARTICLE TRANSPORT FACILITY

(71) Applicant: Daifuku Co., Ltd., Osaka (JP)

(72) Inventors: Masashige Iwata, Hinocho (JP); Hiroaki Nakamura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 820 days.

(21) Appl. No.: 17/781,607

(22) PCT Filed: Jul. 30, 2020

(86) PCT No.: PCT/JP2020/029311
§ 371 (c)(1),
(2) Date: Jun. 1, 2022

(87) PCT Pub. No.: WO2021/111674
PCT Pub. Date: Jun. 10, 2021

(65) Prior Publication Data
US 2023/0001959 A1    Jan. 5, 2023

(30) Foreign Application Priority Data

Dec. 2, 2019  (JP) ................................. 2019-217857

(51) Int. Cl.
*B61B 13/12* (2006.01)
*B60M 1/30* (2006.01)
*B61B 13/02* (2006.01)
*B65G 1/04* (2006.01)

(52) U.S. Cl.
CPC .............. *B61B 13/12* (2013.01); *B60M 1/30* (2013.01); *B61B 13/02* (2013.01); *B65G 1/0492* (2013.01)

(58) Field of Classification Search
CPC .......... B61B 13/02; B61B 13/12; B60M 1/30; B65G 1/0492
See application file for complete search history.

(56) References Cited

U.S. PATENT DOCUMENTS 4,671,183 A * 6/1987 Fujita ..................... B61C 13/04
104/118

FOREIGN PATENT DOCUMENTS

| CN | 205221714 U  | 5/2016  |
| CN | 109748022 A  | 5/2019  |
| EP | 0647552 A1   | 4/1995  |
| JP | 2013224185 A | 10/2013 |
| WO | 2017178451 A1| 10/2017 |

* cited by examiner

Primary Examiner — Robert J McCarry, Jr.
(74) Attorney, Agent, or Firm — The Webb Law Firm

(57) ABSTRACT

A rail unit includes an upper plate segment extending in a width direction, a lower plate segment extending in the width direction and at a position in a downward direction from the upper plate segment, and an intermediate plate segment extending in a vertical direction and joining an edge of the upper plate segment in a first width direction and an edge of the lower plate segment in a first width direction. A power feeder is located in a space defined by the upper plate segment, the intermediate plate segment, and the lower plate segment in the rail unit. The upper plate segment includes a traveling surface facing in an upward direction. The lower plate segment includes a lower flat portion extending in a traveling path direction and the width direction, and a groove protruding in the downward direction from the lower flat portion and extending continuously in the traveling path direction.

20 Claims, 6 Drawing Sheets

TRAVELING RAIL AND ARTICLE TRANSPORT FACILITY

CROSS-REFERENCE TO RELATED APPLICATIONS

This application is the United States national phase of International Application No. PCT/JP2020/029311 filed Jul. 30, 2020, and claims priority to Japanese Patent Application No. 2019-217857 filed Dec. 2, 2019, the disclosures of which are hereby incorporated by reference in their entirety.

BACKGROUND OF THE INVENTION

Field of the Invention

The present invention relates to a traveling rail defining a traveling path for an article transport vehicle for transporting articles, and an article transport facility including such traveling rails.

Description of Related Art

Traveling rails are known as described in, for example, Japanese Unexamined Patent Application Publication No. 2013-224185 (Patent Literature 1). Reference signs and names in parentheses used hereafter in describing the background are the reference signs and names in the cited literature. A traveling rail described in Patent Literature 1 includes a rail unit (front beam 16a) installed to extend along a traveling path, and a power feeder (feeder line 8) for feeding power to a power receiver (collector 9) in an article transport vehicle (article transport cart 2) through contact with the article transport vehicle. The rail unit includes an upper plate segment having a traveling surface, a lower plate segment at a position in a downward direction from the upper plate segment, and an intermediate plate segment joining an edge of the upper plate segment in a first width direction and an edge of the lower plate segment in the first width direction. The power feeder is located in the space defined by the upper plate segment, the lower plate segment, and the intermediate plate segment.

Patent Literature 1: Japanese Unexamined Patent Application Publication No. 2013-224185

SUMMARY OF THE INVENTION

In the rail unit in the traveling rail described above, any friction dust produced upon contact of the power receiver with the power feeder can be received on the lower plate segment to reduce scattering of such friction dust out of the traveling rail. However, friction dust received on the lower plate segment in the rail unit described above accumulates on the lower plate segment in a dispersed manner. Removing such friction dust from the lower plate segment can take time and effort.

Traveling rails that allow easy removal of friction dust and an article transport facility including such traveling rails are awaited.

A traveling rail according to an aspect of the present disclosure defines a traveling path for an article transport vehicle for transporting an article. The traveling rail includes a rail unit extending in a traveling path direction in which the traveling path extends, and a power feeder that feeds power to a power receiver in the article transport vehicle through contact with the power receiver. The rail unit includes an upper plate segment being a plate extending continuously in the traveling path direction and extending in a width direction, a lower plate segment being a plate extending continuously in the traveling path direction and extending in the width direction, and being at a position in a downward direction from the upper plate segment, and an intermediate plate segment being a plate extending continuously in the traveling path direction and extending in a vertical direction, and joining an edge of the upper plate segment in a first width direction and an edge of the lower plate segment in the first width direction. The width direction is a direction orthogonal to the traveling path direction as viewed in the vertical direction. The width direction includes the first width direction and a second width direction opposite to each other. The power feeder is located in a space defined by the upper plate segment, the intermediate plate segment, and the lower plate segment in the rail unit and extends continuously in the traveling path direction. The upper plate segment includes a traveling surface facing in an upward direction to allow a wheel in the article transport vehicle to roll on the traveling surface. The lower plate segment includes a lower flat portion being a flat plate extending in the traveling path direction and the width direction, and a groove protruding in the downward direction from the lower flat portion and extending continuously in the traveling path direction.

The structure including the power feeder located in the space defined by the upper plate segment, the intermediate plate segment, and the lower plate segment in the rail unit allows friction dust produced upon contact of the power receiver with the power feeder to be received on the lower plate segment in the rail unit. This structure thus reduces scattering of friction dust around. The lower plate segment includes the lower flat portion and the groove to facilitate friction dust received on the lower plate segment to accumulate in the groove. This structure thus reduces scattering of friction dust from the traveling rail and also allows easy removal of friction dust accumulating on the lower plate segment.

An article transport facility according to an aspect of the present disclosure includes a first traveling rail being the traveling rail according to the above aspect, a second traveling rail spaced apart from the first traveling rail in the second width direction, and wiring extending continuously in the traveling path direction. The second traveling rail includes a rail unit. The rail unit includes a second upper plate segment being a plate extending continuously in the traveling path direction and extending in a width direction, a second lower plate segment being a plate extending continuously in the traveling path direction and extending in the width direction, and being at a position in the downward direction from the second upper plate segment, and a second intermediate plate segment being a plate extending continuously in the traveling path direction and extending in the vertical direction, and joining an edge of the second upper plate segment in the second width direction and an edge of the second lower plate segment in the second width direction. The second upper plate segment includes a second traveling surface facing in the upward direction to allow a wheel in the article transport vehicle to roll on the second traveling surface. The second lower plate segment includes a second lower flat portion being a flat plate extending in the traveling path direction and the width direction, and a second groove protruding in the downward direction from the second lower flat portion and extending continuously in the traveling path direction. The wiring is located in the second groove.

The structure allows the article transport vehicle to travel along the first traveling rail and the second traveling rail to transport an article. The wiring in the second groove on the second traveling rail is less likely to move in the width direction. The second traveling rail has the same structure as the first traveling rail and includes the second upper plate segment, the second lower plate segment, and the second intermediate plate segment. The first traveling rail and the second traveling rail can thus be formed from members with the same cross section.

DESCRIPTION OF THE INVENTION

1. First Embodiment

Figure 1:
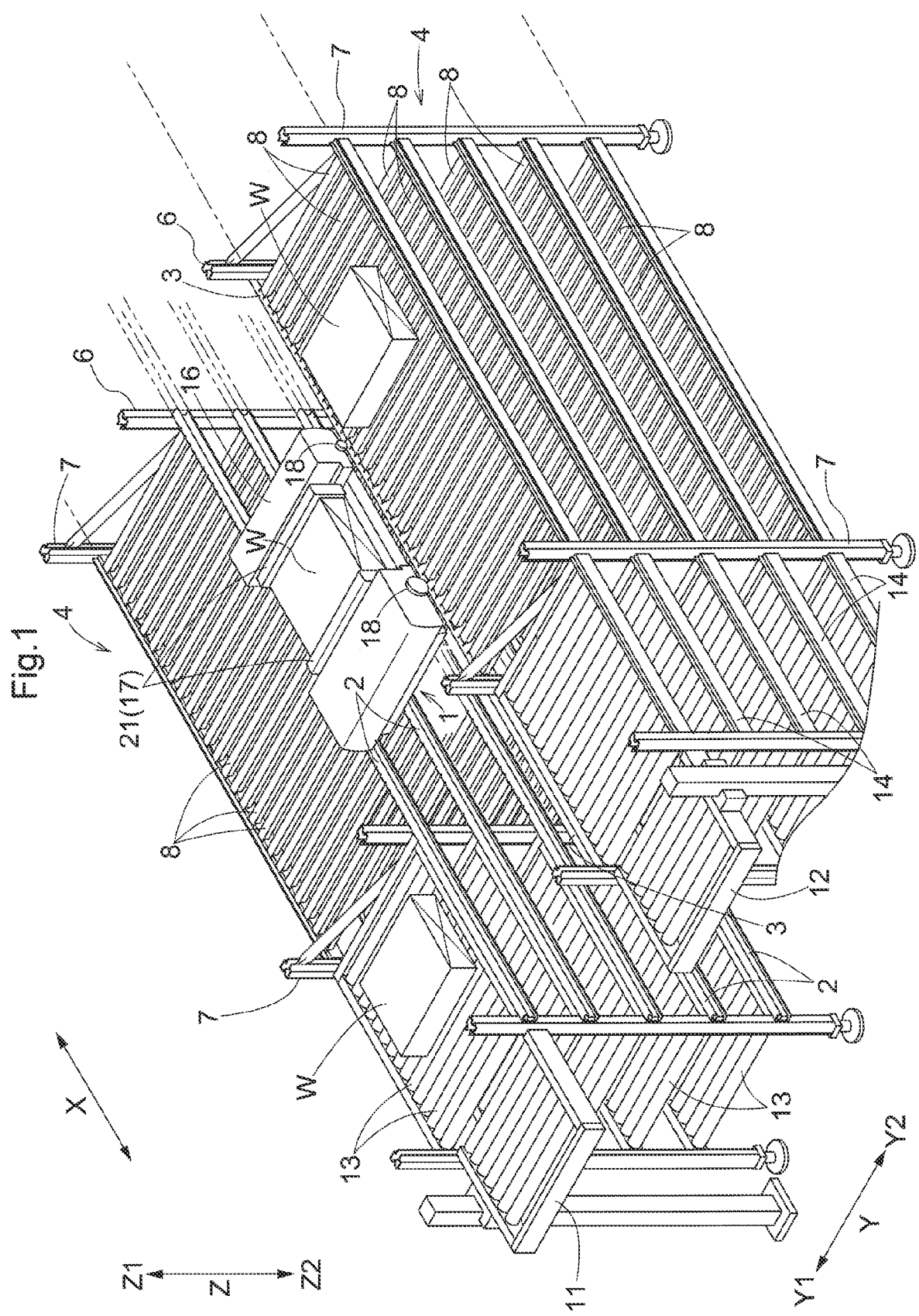
FIG. 1 is a perspective view of an article transport facility according to a first embodiment.

A traveling rail and an article transport facility according to one or more embodiments will now be described with reference to the drawings. The article transport facility shown in FIG. 1 includes article transport vehicles 1 for transporting articles W, first traveling rails 2 (corresponding to a traveling rail) that each define a traveling path for the article transport vehicles 1, second traveling rails 3 that each define the traveling path for the article transport vehicles 1 and are spaced apart from the first traveling rails 2 in a second width direction Y2, wiring 44 continuous in a traveling path direction X in which the traveling path extends, and article storage shelves 4 for storing articles W. The direction orthogonal to the traveling path direction X as viewed in a vertical direction Z is a width direction Y. The width direction Y includes a first width direction Y1 and the second width direction Y2 that are opposite to each other.

A pair of article storage shelves 4 are installed to face each other across the traveling path. Each article storage shelve 4 in the pair includes multiple front posts 6 that are erected adjacent to one another in the traveling path direction X, multiple rear posts 7 that are erected in the traveling path direction X at positions opposite to the traveling path in the width direction Y from the front posts 6, and multiple shelf boards 8 arranged in the vertical direction Z.

The article storage shelves 4 support the shelf boards 8 arranged in the vertical direction Z with the front posts 6 and the rear posts 7. The article storage shelves 4 receive articles W on the shelf boards 8.

The article transport vehicles 1 are installed on the respective shelf boards 8 that are arranged in the vertical direction Z.

The article transport facility includes a loading lifter 11 and an unloading lifter 12 that each can be raised and lowered in the vertical direction Z, and loading conveyors 13 and unloading conveyors 14 installed on the respective shelf boards 8 that are arranged in the vertical direction Z.

In the article transport facility, an article W placed on the loading lifter 11 is transported by the loading lifter 11 to one of the loading conveyors 13 that are located at different levels. The article W on one loading conveyor 13 is then transported onto the shelf board 8 corresponding to the loading conveyor 13 by the article transport vehicle 1 corresponding to the loading conveyor 13 located at the corresponding level. In the article transport facility, each article W on the shelf board 8 is transported onto the unloading conveyor 14 located at the level corresponding to the shelf board 8 by the article transport vehicle 1 corresponding to the shelf board 8 located at the corresponding level. The article W supported on one of the unloading conveyors 14 at the different levels is unloaded out of the article transport facility as being moved with the unloading lifter 12.

Figure 2:
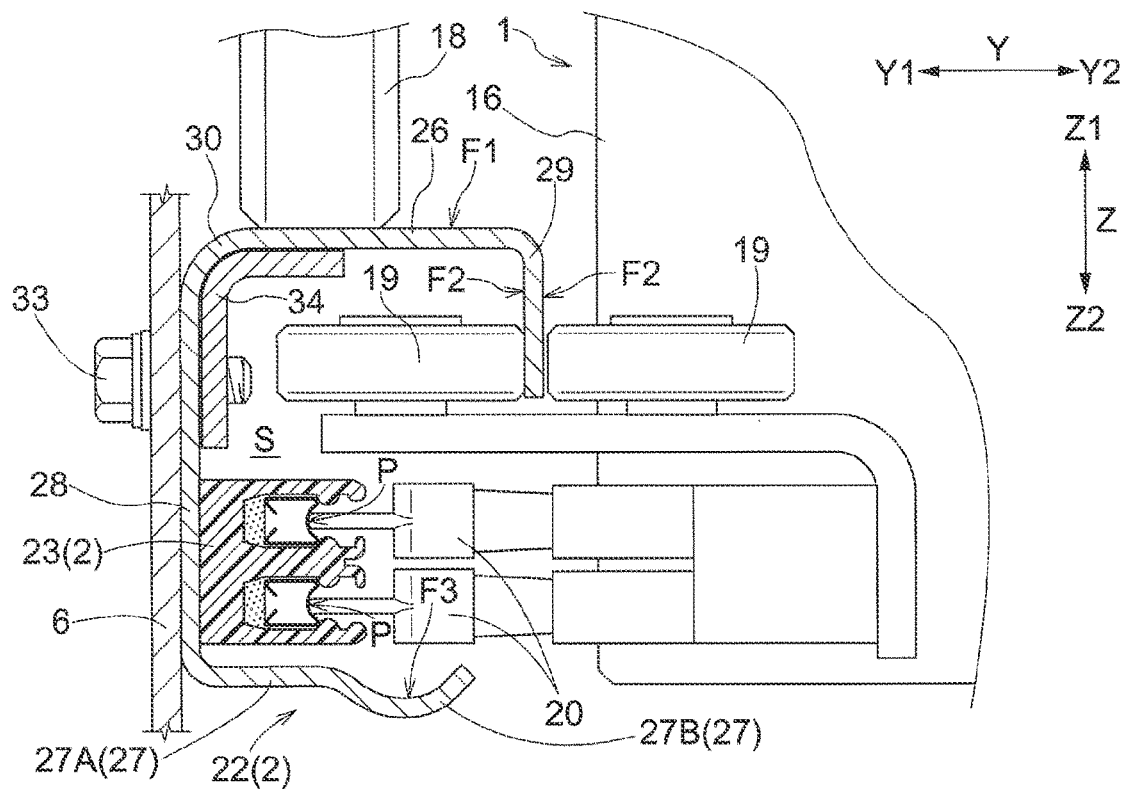
FIG. 2 is a cross-sectional view of a first traveling rail in the first embodiment.
Figure 3:
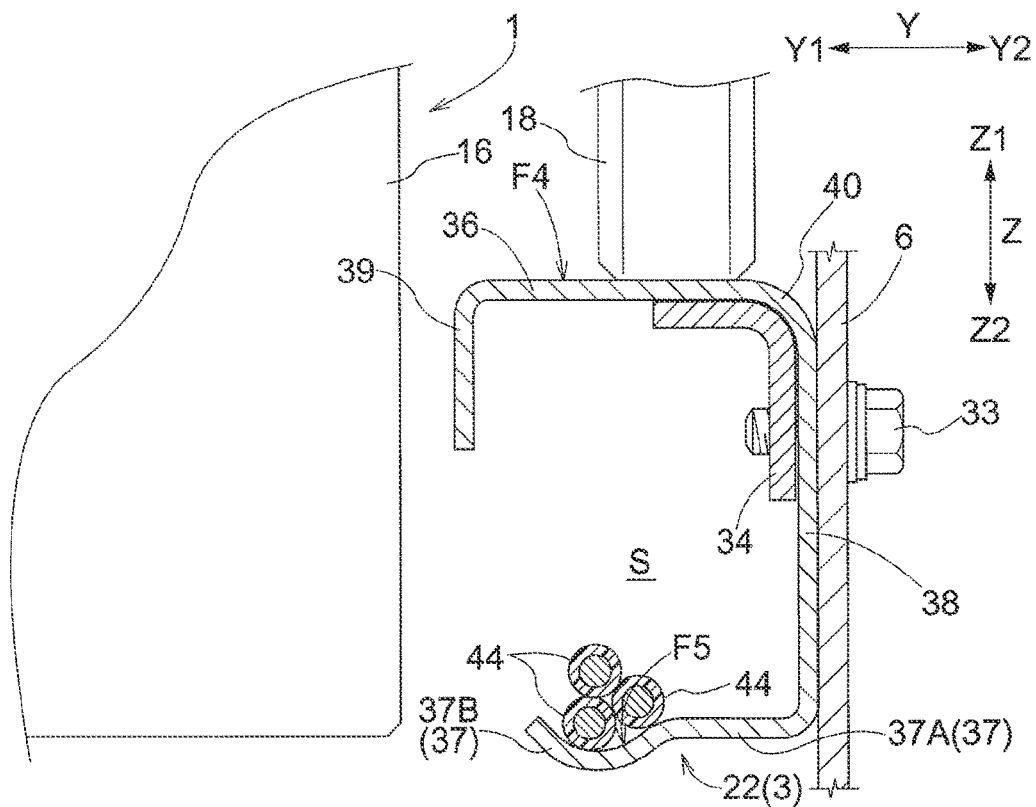
FIG. 3 is a cross-sectional view of a second traveling rail in the first embodiment.

Each article transport vehicle 1 includes a traveling unit 16 that travels in the traveling path direction X and a transferer 17 for transferring an article W in the width direction Y. The traveling unit 16 supports the transferer 17. The transferer 17 includes a pair of fork portions 21 that can be advanced and retracted in the width direction Y and can have a variable distance between them. As shown in FIGS. 2 and 3, the traveling unit 16 includes multiple wheels 18, multiple guide wheels 19, and contact power receivers 20 that can come in contact with a power feeder 23 (described below) to receive power. The multiple wheels 18 include wheels 18 to roll on the first traveling rail 2 and wheels 18 to roll on the second traveling rail 3. In the present embodiment, the multiple guide wheels 19 come in contact with and are guided by the first traveling rail 2.

The power receivers 20 receive power, which is then fed to the traveling unit 16 and the transferer 17 as driving power. The traveling unit 16 travels on the first traveling rail 2 and the second traveling rail 3 in the traveling path direction X while being guided by the first traveling rail 2 with some or all of the wheels 18 being driven and rotating. As the fork portions 21 are driven, the transferer 17 transfers an article W between the traveling unit 16 and the shelf board 8, and between the traveling unit 16 and the loading conveyor 13 or the unloading conveyor 14.

The first traveling rails 2 will now be described. As shown in FIG. 2, each first traveling rail 2 includes a rail unit 22 extending in the traveling path direction X and the power feeder 23 that feeds power to the power receivers 20 in the article transport vehicle 1. In the present embodiment, each first traveling rail 2 is an edge of the corresponding shelf board 8 in the second width direction Y2. For an article W to be transferred by the transferer 17 between the traveling unit 16 and the shelf board 8, the article W moves in the width direction Y while sliding on a top surface of the first traveling rail 2 (a traveling surface F1 described later).

The rail unit 22 includes a first upper plate segment 26 (corresponding to an upper plate segment), a first lower plate segment 27 (corresponding to a lower plate segment), and a first intermediate plate segment 28 (corresponding to an intermediate plate segment). In the present embodiment, the rail unit 22 further includes a first flange 29 (corresponding to a flange). The first upper plate segment 26 is a plate extending continuously in the traveling path direction X and extending in the width direction Y. The first lower plate segment 27 is a plate extending continuously in the traveling path direction X and extending in the width direction Y. The first lower plate segment 27 is at a position in a downward direction Z2 from the first upper plate segment 26. The first intermediate plate segment 28 is a plate extending continuously in the traveling path direction X and extending in the vertical direction Z. The first intermediate plate segment 28 joins an edge of the first upper plate segment 26 in the first width direction Y1 and an edge of the first lower plate segment 27 in the first width direction Y1. The first flange 29 is a plate extending continuously in the traveling path direction X and extending in the vertical direction Z. The first flange 29 extends, in the downward direction Z2, from an edge of the first upper plate segment 26 in the second width direction Y2. In the present embodiment, the rail unit 22 includes the first upper plate segment 26, the first lower plate segment 27, and the first intermediate plate segment 28, thus being in an angled C shape as viewed in the traveling path direction X.

The rail unit 22 is connected to the front posts 6. In the present embodiment, the rail unit 22 is connected to at least a pair of front posts 6 that are adjacent to each other in the traveling path direction X. More specifically, the rail unit 22 is connected to each of these front posts 6 adjacent in the traveling path direction X with a first fastener 33 at the corresponding position. To connect the rail unit 22 to each front post 6, the first fastener 33 is placed through the front post 6 and the first intermediate plate segment 28 and is screwed into a fastening plate 34. The fastening plate 34 includes a portion along the first upper plate segment 26 and a portion along the first intermediate plate segment 28, and has an overall L shape as viewed in the traveling path direction. The fastening plate 34 is a plate with an internal thread and is located opposite to the front posts 6 with the first intermediate plate segment 28 between them. In the present embodiment, the fastening plate 34 is located in a space S defined by the first upper plate segment 26, the first intermediate plate segment 28, and the first lower plate segment 27 in the rail unit 22.

The power feeder 23 is placed in the space S in the rail unit 22. The power feeder 23 extends continuously in the traveling path direction X. In the present embodiment, the power feeder 23 is supported on the first intermediate plate segment 28. In more detail, the power feeder 23 is connected to the first intermediate plate segment 28, and is spaced apart from the first lower plate segment 27 in an upward direction Z1 and is spaced apart from the first upper plate segment 26 in the downward direction Z2. More specifically, the power feeder 23 is connected to the first intermediate plate segment 28 at a position in the downward direction Z2 from the midpoint on the first intermediate plate segment 28 in the vertical direction Z. Thus, the distance between the power feeder 23 and the first upper plate segment 26 in the vertical direction Z is greater than the distance between the power feeder 23 and the first lower plate segment 27 in the vertical direction Z.

The first upper plate segment 26 has the traveling surface F1 facing in the upward direction Z1. The traveling surface F1 allows the wheels 18 in the article transport vehicle 1 to roll. An arc-shaped first curved portion 30 (corresponding to a curved portion) as viewed in the traveling path direction X is at the joint between the first upper plate segment 26 and the first intermediate plate segment 28. Although the joint between the first upper plate segment 26 and the first flange 29 and the joint between the first lower plate segment 27 and the first intermediate plate segment 28 are also arc-shaped as viewed in the traveling path direction, the first curved portion 30 is arc-shaped with a greater radius than those joints.

The first flange 29 has first guide surfaces F2 (corresponding to guide surfaces) on which the guide wheels 19 in the article transport vehicle 1 rolls. In the present embodiment, the two surfaces of the first flange 29 facing in the first width direction Y1 and in the second width direction Y2 serve as the first guide surfaces F2. Thus, the first flange 29 has the first guide surface F2 facing in the first width direction Y1 in contact with the guide wheels 19 to restrict the article transport vehicle 1 from moving in the second width direction Y2, and has the other first guide surface F2 facing in the second width direction Y2 in contact with the guide wheels 19 to restrict the article transport vehicle 1 from moving in the first width direction Y1. This allows the article transport vehicle 1 to be guided in the traveling path direction X.

The first lower plate segment 27 includes a first lower flat portion 27A (corresponding to a lower flat portion) extending in the traveling path direction X and in the width direction Y, and a first groove 27B (corresponding to a groove) protruding in the downward direction Z2 from the first lower flat portion 27A and extending continuously in the traveling path direction X. In the present embodiment, the first groove 27B extends continuously in the second width direction Y2 from the first lower flat portion 27A. In the illustrated example, an edge of the first groove 27B in the second width direction Y2 is an edge of the first lower plate segment 27 in the second width direction Y2.

In more detail, the first lower flat portion 27A extends continuously in the second width direction Y2 from the edge of the first intermediate plate segment 28 in the downward direction Z2, and the first groove 27B extends continuously in the second width direction Y2 from the edge of the first lower flat portion 27A. The edge of the first groove 27B is the edge of the first lower plate segment 27 in the second width direction Y2.

In the present embodiment, the first groove 27B fully overlaps the first upper plate segment 26 as viewed in the vertical direction. More specifically, the first groove 27B has the edge in the second width direction Y2 at a position in the first width direction Y1 from the first guide surface F2 of the first flange 29 facing in the first width direction Y1. Also, the first groove 27B has an edge in the first width direction Y1 at a position in the second width direction Y2 from the edge of the flat portion of the first upper plate segment 26 in the first width direction Y1. The flat portion of the first upper plate segment 26 is a portion of the first upper plate segment 26 excluding the arc-shaped first curved portion 30 joining the first upper plate segment 26 and the first intermediate plate segment 28.

The lowermost portion of a groove surface F3, which is the surface of the first groove 27B facing in the upward direction Z1, is at a position in the second width direction Y2 from a contact position P of the power feeder 23 with each power receiver 20. The contact position P is a position on the power feeder 23 that can come in contact with each power receiver 20. In the present embodiment, the position of the first groove 27B is defined with reference to an innermost position in the first width direction Y1 within a range in which the power feeder 23 can come in contact with each power receiver 20. In the present embodiment, the lowermost portion of the groove surface F3 is at a position in the second width direction Y2 from the edge of the power feeder 23 in the second width direction Y2. In the illustrated example, further, the first groove 27B has the edge in the first width direction Y1 at a position in the first width direction Y1 from the edge of the power feeder 23 in the second width direction Y2. This structure allows any friction dust produced at the contact position between the power feeder 23 and the power receivers 20 to be received on the groove surface F3.

The first groove 27B partially overlaps the power feeder 23 as viewed in the vertical direction in the present embodiment, and the power feeder 23 is spaced apart from the first lower plate segment 27 in the upward direction Z1. This structure allows any friction dust produced upon contact of the power receivers 20 with the power feeder 23 to accumulate also in a portion of the first groove 27B overlapping the power feeder 23 as viewed in the vertical direction.

The cross section of the first groove 27B orthogonal to the traveling path direction X may have an arc shape with a central angle of less than 180°. More specifically, the cross section of the first groove 27B may have an arc shape with a central angle less than 120°, or specifically an arc shape with a central angle less than 90°. In the present embodiment, the cross section of the first groove 27B has an arc shape with a central angle of 75 to 85°. In the illustrated example, the first groove 27B has the edge in the first width direction Y1 and the edge in the second width direction Y2 that are at the same height, and has the lowermost position of the groove surface F3 at the middle of the first groove 27B in the width direction Y.

As shown in FIG. 3, each second traveling rail 3 includes a rail unit 22 extending in the traveling path direction X, but includes no power feeder 23, unlike each first traveling rail 2.

Each second traveling rail 3 includes a rail unit 22 including a second upper plate segment 36, a second lower plate segment 37, and a second intermediate plate segment 38. In the present embodiment, the rail unit 22 in the second traveling rail 3 further includes a second flange 39. The second upper plate segment 36 is a plate extending continuously in the traveling path direction X and extending in the width direction Y. The second lower plate segment 37 is a plate extending continuously in the traveling path direction X and extending in the width direction Y. The second lower plate segment 37 is at a position in the downward direction Z2 from the second upper plate segment 36. The second intermediate plate segment 38 is a plate extending continuously in the traveling path direction X and extending in the vertical direction Z. The second intermediate plate segment 38 joins an edge of the second upper plate segment 36 in the second width direction Y2 and an edge of the second lower plate segment 37 in the second width direction Y2. The second flange 39 is a plate extending continuously in the traveling path direction X and extending in the vertical direction Z. The second flange 39 extends, in the downward direction Z2, from an edge of the second upper plate segment 36 in the first width direction Y1.

The second upper plate segment 36 has a second traveling surface F4 facing in the upward direction Z1. The second traveling surface F4 allows the wheels 18 in the article transport vehicle 1 to roll. An arc-shaped second curved portion 40 as viewed in the traveling path direction X is at the joint between the second upper plate segment 36 and the second intermediate plate segment 38, similarly to the joint between the first upper plate segment 26 and the first intermediate plate segment 28. Further, the second lower plate segment 37 includes a second lower flat portion 37A extending in the traveling path direction X and in the width direction Y, and a second groove 37B protruding in the downward direction Z2 from the second lower flat portion 37A and extending continuously in the traveling path direction X. The surface of the second groove 37B facing in the upward direction Z1 is a second groove surface F5. In the present embodiment, the wiring 44 is installed to extend continuously in the traveling path direction X in the article transport facility. The second groove 37B on the second traveling rail 3 may be used as a groove to receive the wiring 44. In other words, the wiring 44 is located in the second groove 37B. More specifically, the wiring 44 is in contact with the second groove surface F5 of the second groove 37B.

In this manner, the rail unit 22 in the second traveling rail 3 includes the second upper plate segment 36, the second lower plate segment 37, the second intermediate plate segment 38, and the second flange 39. The second lower plate segment 37 includes the second lower flat portion 37A and the second groove 37B. The rail unit 22 in the second traveling rail 3 is thus symmetric to the rail unit 22 in the first traveling rail 2 in the width direction Y. For example, the rail unit 22 for the first traveling rail 2 may thus be used for the second traveling rail 3 by turning the rail unit 22 by 180° about an axis extending in the vertical direction Z. In the present embodiment, the rail unit 22 for the second traveling rail 3 does not have a hole or any other structure to fasten the power feeder 23, and thus the power feeder 23 cannot be fixed to the rail unit 22. Thus, the rail unit 22 in the first traveling rail 2 and the rail unit 22 in the second traveling rail 3 do not have the same shape, although the rail unit 22 in the second traveling rail 3 is formed using the same member as the rail unit 22 in the first traveling rail 2.

2. Second Embodiment

Figure 4:
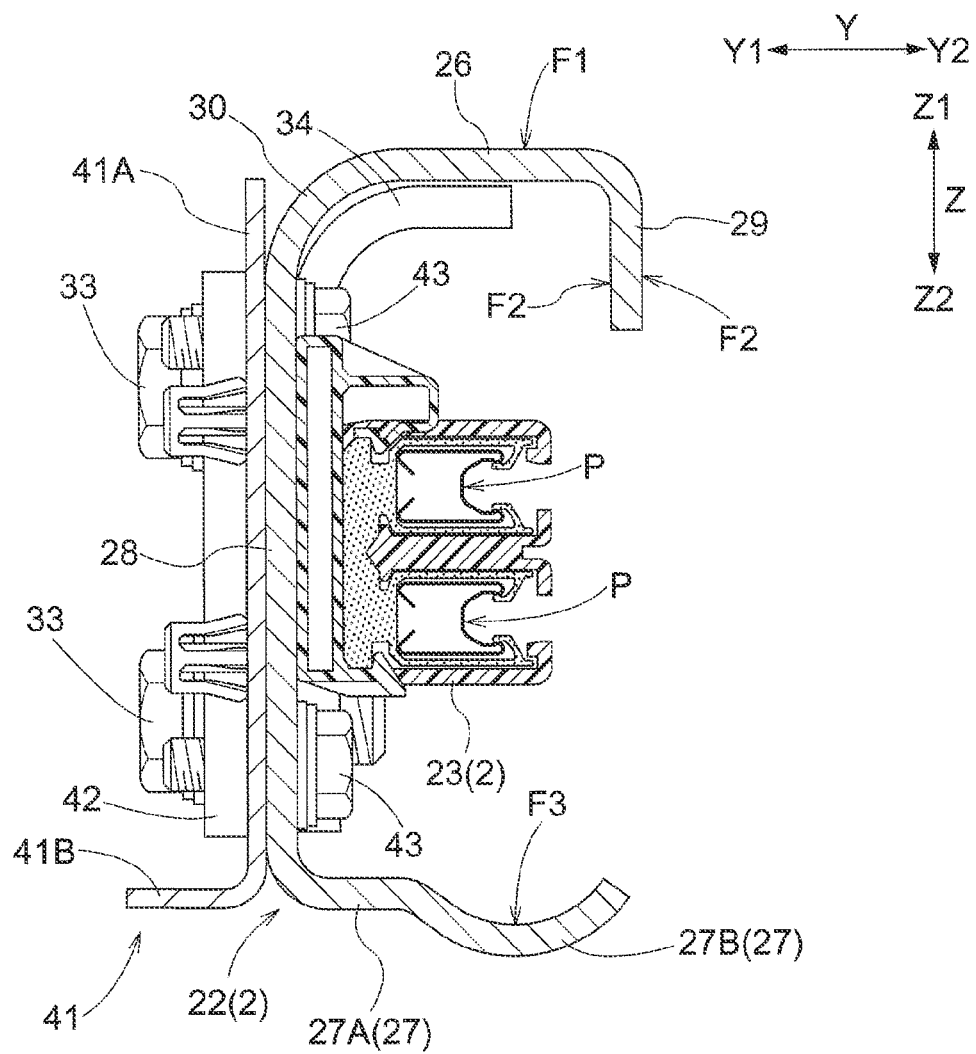
FIG. 4 is a cross-sectional view of a first traveling rail in a second embodiment.

A traveling rail and an article transport facility according to a second embodiment will now be described with reference to FIG. 4. A rail unit 22 in the present embodiment will be described, focusing on its differences from the corresponding component in the first embodiment described above. The components that will not be described herein are the same as described in the first embodiment above.

In the present embodiment, the power feeder 23 is connected to the first intermediate plate segment 28 and is at the midpoint on the first intermediate plate segment 28 in the vertical direction Z. Thus, the distance between the power feeder 23 and the first upper plate segment 26 in the vertical direction Z and the distance between the power feeder 23 and the first lower plate segment 27 in the vertical direction Z are substantially the same.

In the present embodiment, the first groove 27B overlaps both the first upper plate segment 26 and the first flange 29 as viewed in the vertical direction. More specifically, the first groove 27B has the edge in the second width direction Y2 at a position in the second width direction Y2 from the first guide surface F2 of the first flange 29 facing in the first width direction Y1. In the illustrated example, the first groove 27B has the edge in the second width direction Y2 at a position in the first width direction Y1 from the first guide surface F2 of the first flange 29 facing in the second width direction Y2. In other words, the first groove 27B has the edge in the second width direction Y2 within the range in the width direction Y overlapping the first flange 29 as viewed in the vertical direction. Also, the first groove 27B has the edge in the first width direction Y1 at a position in the second width direction Y2 from the edge of the flat portion of the first upper plate segment 26 in the first width direction Y1.

In the present embodiment as well, the lowermost portion of the groove surface F3, which is the surface of the first groove 27B facing in the upward direction Z1, is at a position in the second width direction Y2 from the contact position P of the power feeder 23 with each power receiver 20. In the present embodiment, the lowermost portion of the groove surface F3 is at a position in the first width direction Y1 from the edge of the power feeder 23 in the second width direction Y2. In contrast, the first groove 27B has the edge in the second width direction Y2 at a position in the second width direction Y2 from the edge of the power feeder 23 in the second width direction Y2.

In the present embodiment, the first intermediate plate segment 28 is fixed to a reinforcement 41 reinforcing the rail unit 22, and has the surface in the first width direction Y1 being in contact with the reinforcement 41. The reinforcement 41 includes a planer portion 41A and a projection 41B. The planer portion 41A is a plate extending continuously in the traveling path direction X and extending in the vertical direction Z. The projection 41B extends continuously in the traveling path direction X and protrudes, in the first width direction Y1, from the edge of the planer portion 41A in the downward direction Z2. With the surface of the first intermediate plate segment 28 in the first width direction Y1 in contact with the surface of the planer portion 41A of the reinforcement 41 in the second width direction Y2, a second fastener 43 is placed through the first intermediate plate segment 28 and the planer portion 41A and is screwed into a screw plate 42. The first intermediate plate segment 28 is thus fixed to the reinforcement 41. The screw plate 42 is a plate with an internal thread. The screw plate 42 is located opposite to the first intermediate plate segment 28 with the reinforcement 41 between them. In the present embodiment, the reinforcement 41 is located without overlapping any front posts 6 in the traveling path direction X.

3. Other Embodiments

A traveling rail and an article transport facility according to other embodiments will now be described.

(1) In the first and second embodiments described above, the second traveling rail 3 includes the second upper plate segment 36, the second lower plate segment 37, and the second intermediate plate segment 38, and the second lower plate segment 37 includes the second lower flat portion 37A and the second groove 37B. However, the embodiments are not limited to these structures. The shape of the second traveling rail 3 may be modified as appropriate. For example, the second lower plate segment 37 may not include one or both of the second lower flat portion 37A and the second groove 37B.

Figure 5:
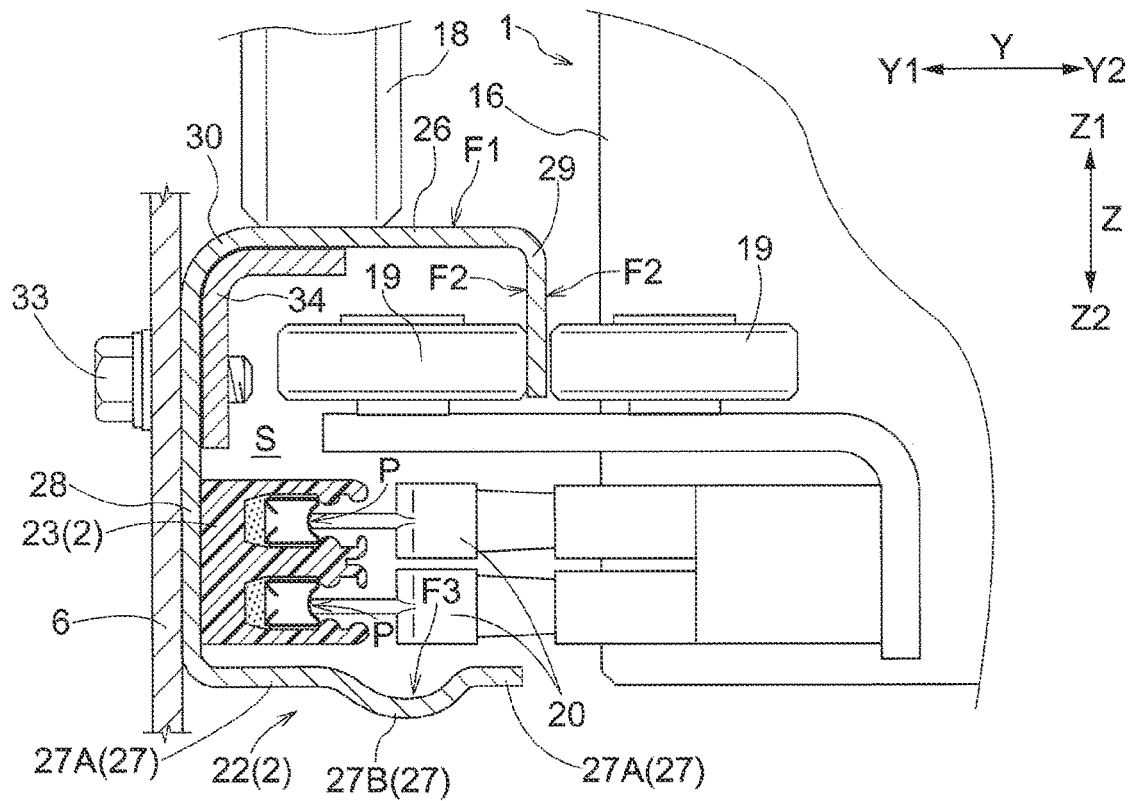
FIG. 5 is a cross-sectional view of a first traveling rail in another embodiment.

(2) In the first and second embodiments described above, the first lower flat portion 27A is located adjacent to the first groove 27B in the first width direction Y1 alone. However, the embodiments are not limited to this structure. For example, as shown in FIG. 5, first lower flat portions 27A may be at positions in the first width direction Y1 and in the second width direction Y2 from the first groove 27B. In some embodiments, a first lower flat portion 27A may be located adjacent to the first groove 27B in the second width direction Y2 alone. In other words, the first groove 27B may have the edge in the second width direction Y2 that is not the edge of the first lower plate segment 27 in the second width direction Y2.

(3) In the first and second embodiments described above, the lowermost portion of the groove surface F3 of the first groove 27B is at a position in the second width direction Y2 from the contact position P of the power feeder 23 with each power receiver 20. However, the embodiments are not limited to this structure. The lowermost portion of the groove surface F3 may be at the same position as the contact position P of the power feeder 23 with each power receiver 20 or may be at a position in the first width direction Y1 from the contact position P.

(4) In the first and second embodiments described above, the power feeder 23 is spaced apart from the first lower plate segment 27 in the upward direction Z1 and is spaced apart from the first upper plate segment 26 in the downward direction Z2. However, the embodiments are not limited to this structure. For example, the power feeder 23 may be in contact with the first lower plate segment 27 or in contact with the first upper plate segment 26.

(5) In the first and second embodiments described above, the power feeder 23 is supported on the first intermediate plate segment 28. However, the embodiments are not limited to this structure. For example, the power feeder 23 may be supported on the first upper plate segment 26 or on the first lower plate segment 27.

(6) In the first and second embodiments described above, the first groove 27B fully overlaps the first upper plate segment 26 as viewed in the vertical direction. However, the embodiments are not limited to this structure. As viewed in the vertical direction, for example, the first groove 27B may partly extend beyond the first upper plate segment 26 in the second width direction Y2.

Figure 6:
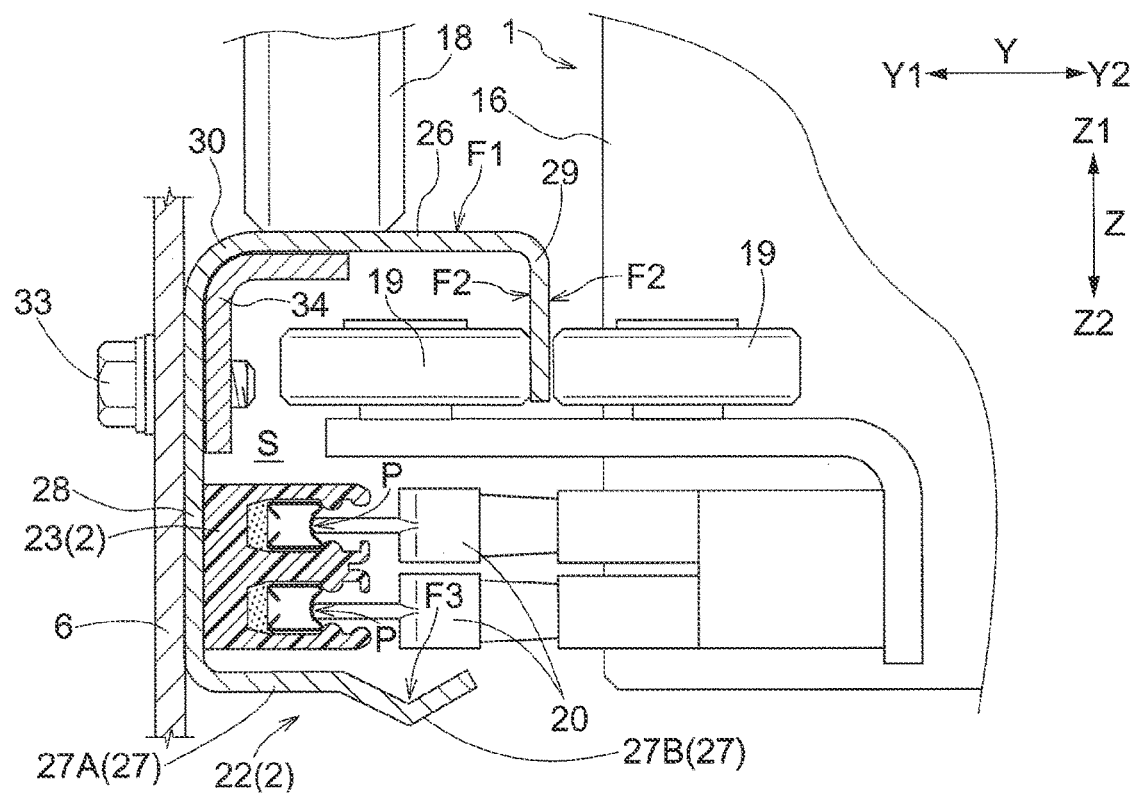
FIG. 6 is a cross-sectional view of a first traveling rail in another embodiment.
Figure 7:
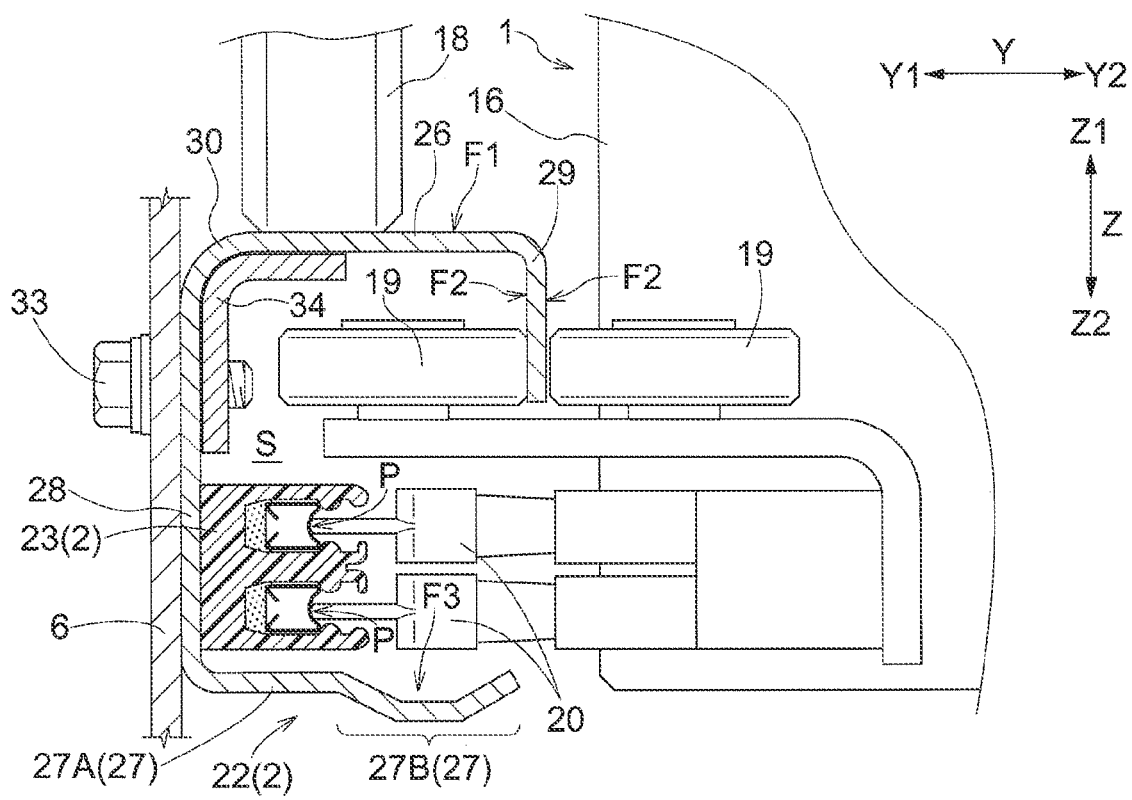
FIG. 7 is a cross-sectional view of a first traveling rail in another embodiment.
Figure 8:
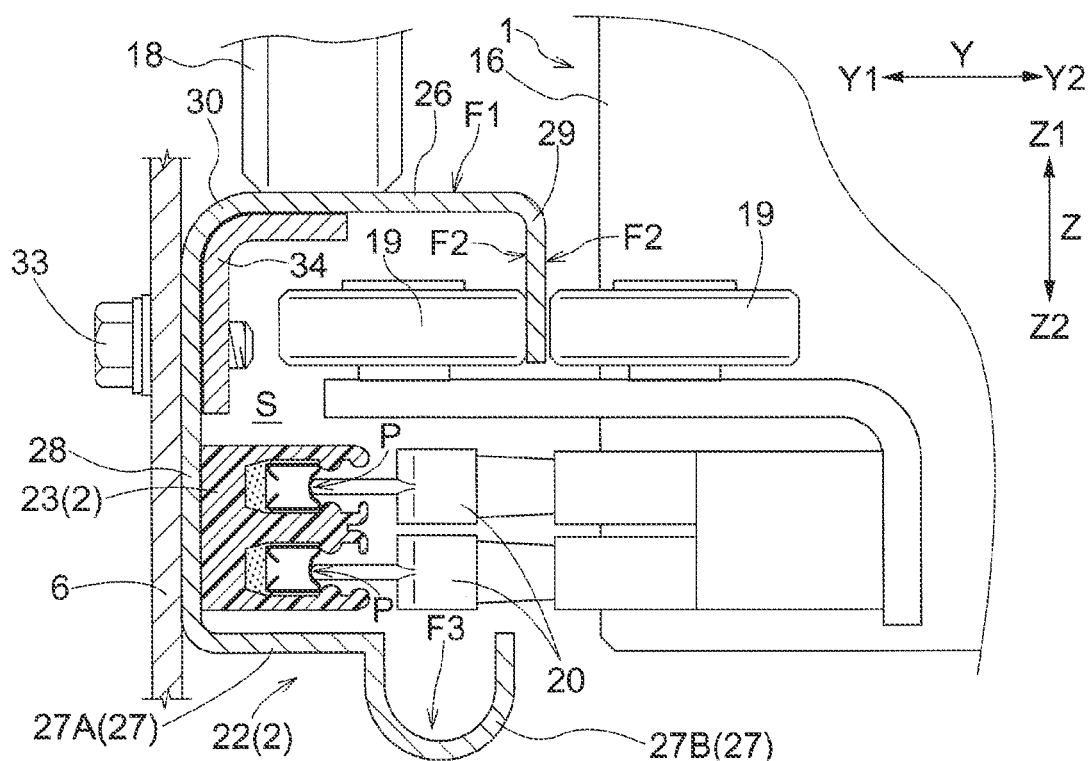
FIG. 8 is a cross-sectional view of a first traveling rail in another embodiment.

(7) In the first and second embodiments described above, the cross section of the first groove 27B orthogonal to the traveling path direction X (hereafter, simply the cross section of the first groove 27B) is arc-shaped. However, the embodiments are not limited to this structure. The cross section of the first groove 27B may be in any other shape. As shown in FIG. 6, for example, the cross section of the first groove 27B may be V-shaped. As shown in FIG. 7, the cross section of the first groove 27B may be trapezoidal. As shown in FIG. 8, the cross section of the first groove 27B may be U-shaped.

(8) In the second embodiment described above, the reinforcement 41 is fixed to the surface of the first intermediate plate segment 28 in the first width direction Y1. However, the embodiment is not limited to this structure. In the second embodiment, for example, the reinforcement 41 may not be fixed to the surface of the first intermediate plate segment 28 in the first width direction Y1. In the first embodiment, the reinforcement 41 is not fixed to the surface of the first intermediate plate segment 28 in the first width direction Y1. In the first embodiment, the reinforcement 41 may be fixed to the surface of the first intermediate plate segment 28 in the first width direction Y1.

(9) In the first and second embodiments described above, the rail unit 22 in the first traveling rail 2 includes the first flange 29 having the first guide surfaces F2. However, the embodiments are not limited to this structure. For example, the first guide surfaces F2 may be included in a member other than the rail unit 22 in the first traveling rail 2, and the rail unit 22 in the first traveling rail 2 may not include the first flange 29. The same applies to the second traveling rail 3.

Figure 9:
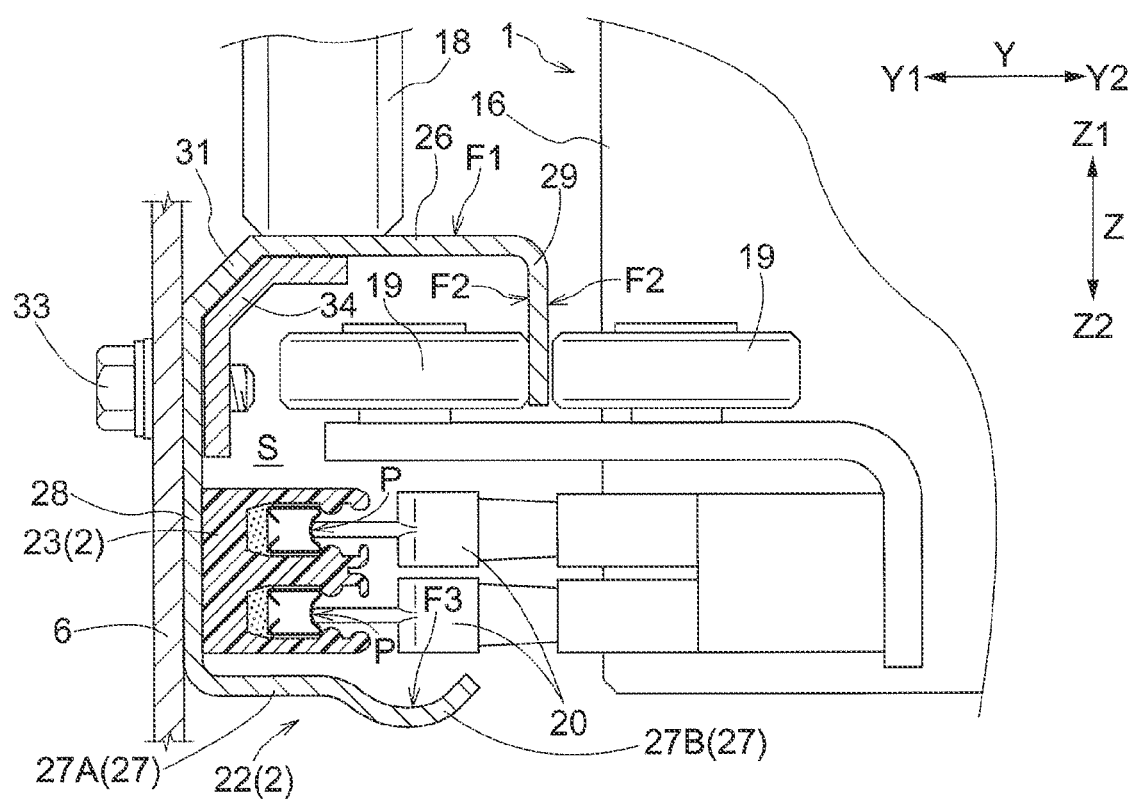
FIG. 9 is a cross-sectional view of a first traveling rail in another embodiment.

(10) In the first and second embodiments described above, the first curved portion 30 that is arc-shaped is at the joint between the first upper plate segment 26 and the first intermediate plate segment 28 as viewed in the traveling path direction. However, the embodiments are not limited to this structure. The shape of the joint between the first upper plate segment 26 and the first intermediate plate segment 28 may be modified as appropriate. As shown in FIG. 9, for example, the joint between the first upper plate segment 26 and the first intermediate plate segment 28 may include a slope 31 that slopes in the downward direction Z2 as the slope 31 extends in the first width direction Y1 as viewed in the traveling path direction. In some embodiments, the first upper plate segment 26 and the first intermediate plate segment 28 may be orthogonal to each other as viewed in the traveling path direction.

(11) In the first and second embodiments described above, the traveling unit 16 travels in the traveling path direction X as being guided by the first traveling rail 2 alone, among the first traveling rail 2 and the second traveling rail 3. However, the embodiments are not limited to this structure. For example, the traveling unit 16 may travel in the traveling path direction X as being guided by the second traveling rail 3 alone, among the first traveling rail 2 and the second traveling rail 3. The traveling unit 16 may travel in the traveling path direction X as being guided by both the first traveling rail 2 and the second traveling rail 3. For the traveling unit 16 traveling in the traveling path direction X as being guided by both the first traveling rail 2 and the second traveling rail 3, the first flange 29 may receive the guide wheels 19 on its two surfaces in the width direction Y, and the second flange 39 may receive the guide wheels 19 on its two surfaces in the width direction Y. The first flange 29 may receive the guide wheels 19 in the first width direction Y1 alone, and the second flange 39 may receive the guide wheels 19 in the second width direction Y2 alone. The first flange 29 may receive the guide wheels 19 in the second width direction Y2 alone, and the second flange 39 may receive the guide wheels 19 in the first width direction Y1 alone.

(12) The structure described in each of the above embodiments may be combined with any other structures described in the other embodiments unless any contradiction arises. The embodiments described herein are merely illustrative in all respects and may be modified variously as appropriate without departing from the spirit and scope of the present disclosure.

4. Overview of the Embodiments

The overview of the traveling rail and the article transport facility described above will be provided.

A traveling rail defines a traveling path for an article transport vehicle for transporting an article. The traveling rail includes a rail unit extending in a traveling path direction in which the traveling path extends, and a power feeder that feeds power to a power receiver in the article transport vehicle through contact with the power receiver. The rail unit includes an upper plate segment being a plate extending continuously in the traveling path direction and extending in a width direction, a lower plate segment being a plate extending continuously in the traveling path direction and extending in the width direction, and being at a position in a downward direction from the upper plate segment, and an intermediate plate segment being a plate extending continuously in the traveling path direction and extending in a vertical direction, and joining an edge of the upper plate segment in a first width direction and an edge of the lower plate segment in the first width direction. The width direction is a direction orthogonal to the traveling path direction as viewed in the vertical direction. The width direction includes the first width direction and a second width direction opposite to each other. The power feeder is located in a space defined by the upper plate segment, the intermediate plate segment, and the lower plate segment in the rail unit and extends continuously in the traveling path direction. The upper plate segment includes a traveling surface facing in an upward direction to allow a wheel in the article transport vehicle to roll on the traveling surface. The lower plate segment includes a lower flat portion being a flat plate extending in the traveling path direction and the width direction, and a groove protruding in the downward direction from the lower flat portion and extending continuously in the traveling path direction.

The structure including the power feeder located in the space defined by the upper plate segment, the intermediate plate segment, and the lower plate segment in the rail unit allows friction dust produced upon contact of the power receiver with the power feeder to be received on the lower plate segment in the rail unit. This structure reduces scattering of friction dust around. The lower plate segment includes the lower flat portion and the groove to facilitate friction dust received on the lower plate segment to accumulate in the groove. This structure thus reduces scattering of friction dust from the traveling rail and allows easy removal of friction dust accumulating on the lower plate segment.

The groove may have a groove surface facing in the upward direction, and the groove surface may include a lowermost portion at a position in the second width direction from a contact position of the power feeder with the power receiver.

This structure allows any friction dust produced at the contact position between the power feeder and the power receiver to be received in the groove. This thus facilitates friction dust received on the lower plate segment to accumulate in the groove.

The groove may extend continuously in the second width direction from the lower flat portion, and an edge of the groove in the second width direction may be an edge of the lower plate segment in the second width direction.

The structure allows any friction dust moving in the second width direction after being received on the lower flat portion to accumulate in the groove, and thus effectively reduces scattering of friction dust out of the traveling rail.

The power feeder may be spaced apart from the lower plate segment in the upward direction.

This structure allows any friction dust produced at the contact position between the power feeder and the power receiver to accumulate in the groove. This structure also allows passage of air between the power feeder and the lower plate segment, thus facilitating heat dissipation from the power feeder.

The power feeder may be supported on the intermediate plate segment.

In this structure, the power feeder may be spaced apart from the lower plate segment in the upward direction.

The groove may fully overlap the upper plate segment as viewed in the vertical direction.

This structure reduces the likelihood of dust produced above the upper plate segment entering the space defined by the upper plate segment, the intermediate plate segment, and the lower plate segment, and thus reduces accumulation of dust in the groove after being produced outside the space.

A cross section of the groove orthogonal to the traveling path direction may have an arc shape with a central angle of less than 180°.

In this structure, the cross section of the groove has an arc shape with a central angle of less than 180°, thus allowing the groove to be relatively shallow. This shape allows easy removal of friction dust accumulating in the groove.

The intermediate plate segment may be fixed to a reinforcement reinforcing the rail unit, and may have a surface in the first width direction being in contact with the reinforcement.

In this structure, the intermediate plate segment that is a plate extending in the vertical direction is fixed to the reinforcement and has its surface in the first width direction being in contact with the reinforcement, thus allowing the reinforcement to properly reinforce the rail unit.

The rail unit may further include a flange. The flange may be a plate extending continuously in the traveling path direction and extending in the vertical direction. The flange may extend in the downward direction from an edge of the upper plate segment in the second width direction. The flange may include a guide surface to allow a guide wheel in the article transport vehicle to roll on the guide surface.

In this structure, the flange in the rail unit has the guide surface. The rail unit can guide the guide wheel in the article transport vehicle in the traveling path direction. Further, the flange extends in the downward direction from the edge of the upper plate segment in the second width direction. The upper plate segment with the traveling surface can easily be highly durable.

An arc-shaped curved portion as viewed in the traveling path direction may be at a joint between the upper plate segment and the intermediate plate segment.

This structure includes the curved portion at the joint. The upper plate segment with the traveling surface can thus easily be highly durable. For an article to slide on the upper surface of the upper plate segment from a position in the first width direction toward a position in the second width direction, the article is less likely to be stuck on the surface.

An article transport facility includes a first traveling rail being the traveling rail, a second traveling rail spaced apart from the first traveling rail in the second width direction, and wiring extending continuously in the traveling path direction. The second traveling rail includes a rail unit. The rail unit includes a second upper plate segment being a plate extending continuously in the traveling path direction and extending in a width direction, a second lower plate segment being a plate extending continuously in the traveling path direction and extending in the width direction, and being at a position in the downward direction from the second upper plate segment, and a second intermediate plate segment being a plate extending continuously in the traveling path direction and extending in the vertical direction, and joining an edge of the second upper plate segment in the second width direction and an edge of the second lower plate segment in the second width direction. The second upper plate segment includes a second traveling surface facing in the upward direction to allow a wheel in the article transport vehicle to roll on the second traveling surface. The second lower plate segment includes a second lower flat portion being a flat plate extending in the traveling path direction and the width direction, and a second groove protruding in the downward direction from the second lower flat portion and extending continuously in the traveling path direction. The wiring is located in the second groove.

This structure allows the article transport vehicle to travel along the first traveling rail and the second traveling rail to transport an article. The wiring located in the second groove on the second traveling rail is less likely to move in the width direction. The second traveling rail has the same structure as the first traveling rail and includes the second upper plate segment, the second lower plate segment, and the second intermediate plate segment. The first traveling rail and the second traveling rail can thus be formed from members with the same cross section.

INDUSTRIAL APPLICABILITY

The technique according to one or more embodiments of the present disclosure can be used for a traveling rail including a rail unit and a power feeder, and for an article transport facility including the traveling rail.

REFERENCE SIGNS LIST 1 article transport vehicle
2 first traveling rail (traveling rail)
3 second traveling rail
18 wheel
20 power receiver
23 power feeder
26 first upper plate segment (upper plate segment)
27 first lower plate segment (lower plate segment)
27A first lower flat portion (lower flat portion)
27B first groove (groove)
28 first intermediate plate segment (intermediate plate segment)
29 first flange (flange)
30 curved portion
36 second upper plate segment
37 second lower plate segment
37A second lower flat portion
37B second groove
38 second intermediate plate segment
41 reinforcement
44 wiring
F1 first traveling surface (traveling surface)
F2 first guide surface (guide surface)
F3 first groove surface (groove surface)
F4 second traveling surface
S space
W article
X traveling path direction
Y width direction
Y1 first width direction
Y2 second width direction
Z vertical direction
Z1 upward direction
Z2 downward direction

The invention claimed is:

1. A traveling rail defining a traveling path for an article transport vehicle for transporting an article, the traveling rail comprising:
   a rail unit extending in a traveling path direction in which the traveling path extends; and
   a power feeder configured to feed power to a power receiver in the article transport vehicle through contact with the power receiver;
   wherein:
   the rail unit comprises an upper plate segment extending continuously in the traveling path direction and extending in a width direction, a lower plate segment extending continuously in the traveling path direction and extending in the width direction, and located at a position in a downward direction from the upper plate segment, and an intermediate plate segment extending continuously in the traveling path direction and extending in a vertical direction, and joining an edge of the upper plate segment in a first width direction and an edge of the lower plate segment in the first width direction, where the width direction is a direction orthogonal to the traveling path direction as viewed in the vertical direction, and the width direction includes the first width direction and a second width direction opposite to each other, the power feeder is located in a space defined by the upper plate segment, the intermediate plate segment, and the lower plate segment in the rail unit and extends continuously in the traveling path direction, the upper plate segment includes a traveling surface facing in an upward direction to allow a wheel in the article transport vehicle to roll on the traveling surface, and the lower plate segment comprises a lower flat portion formed as a flat plate extending in the traveling path direction and the width direction, and a groove extending in the second width direction from the lower flat portion and protruding in the downward direction from the lower flat portion and extending continuously in the traveling path direction, the groove spaced below a contact point of the power feeder and the power receiver and configured to receive friction dust generated by contact between the power feeder and the power receiver.

2. The traveling rail according to claim 1, wherein:
the groove has a groove surface facing in the upward direction, and the groove surface has a lowermost portion at a position in the second width direction from a contact position of the power feeder with the power receiver.

3. The traveling rail according to claim 1, wherein:
the groove extends continuously in the second width direction from the lower flat portion, and
an edge of the groove in the second width direction is an edge of the lower plate segment in the second width direction.

4. The traveling rail according claim 1, wherein:
the power feeder is spaced apart from the lower plate segment in the upward direction.

5. The traveling rail according to claim 1, wherein:
the power feeder is supported on the intermediate plate segment.

6. The traveling rail according to claim 1, wherein:
the groove fully overlaps the upper plate segment as viewed in the vertical direction.

7. The traveling rail according to claim 1, wherein:
a cross section of the groove orthogonal to the traveling path direction has an arc shape with a central angle of less than 180°.

8. The traveling rail according to claim 1, wherein:
the intermediate plate segment is fixed to a reinforcement reinforcing the rail unit and has a surface in the first width direction being in contact with the reinforcement.

9. The traveling rail according to claim 1, wherein:
the rail unit further comprises a flange,
the flange is a plate extending continuously in the traveling path direction and extending in the vertical direction, and the flange extends in the downward direction from an edge of the upper plate segment in the second width direction, and
the flange has a guide surface to allow a guide wheel in the article transport vehicle to roll on the guide surface.

10. The traveling rail according to claim 1, wherein:
an arc-shaped curved portion as viewed in the traveling path direction is at a joint between the upper plate segment and the intermediate plate segment.

11. An article transport facility, comprising:
a first traveling rail comprising the traveling rail according to claim 1;
a second traveling rail spaced apart from the first traveling rail in the second width direction; and
wiring extending continuously in the traveling path direction,
wherein the second traveling rail comprises a rail unit, and the rail unit comprises a second upper plate segment extending continuously in the traveling path direction and extending in a width direction, a second lower plate segment extending continuously in the traveling path direction and extending in the width direction, and located at a position in the downward direction from the second upper plate segment, and a second intermediate plate segment extending continuously in the traveling path direction and extending in the vertical direction, and joining an edge of the second upper plate segment in the second width direction and an edge of the second lower plate segment in the second width direction,
wherein the second upper plate segment has a second traveling surface facing in the upward direction to allow a wheel in the article transport vehicle to roll on the second traveling surface,
wherein the second lower plate segment comprises a second lower flat portion formed as a flat plate extending in the traveling path direction and the width direction, and a second groove protruding in the downward direction from the second lower flat portion and extending continuously in the traveling path direction, and
wherein the wiring is located in the second groove.

12. The article transport facility according to claim 11, wherein:
the groove has a groove surface facing in the upward direction, and the groove surface has a lowermost portion at a position in the second width direction from a contact position of the power feeder with the power receiver.

13. The article transport facility according to claim 11, wherein:
the groove extends continuously in the second width direction from the lower flat portion, and
an edge of the groove in the second width direction is an edge of the lower plate segment in the second width direction.

14. The article transport facility according claim 11, wherein:
the power feeder is spaced apart from the lower plate segment in the upward direction.

15. The article transport facility according to claim 11, wherein:
the power feeder is supported on the intermediate plate segment.

16. The article transport facility according to claim 11, wherein:
the groove fully overlaps the upper plate segment as viewed in the vertical direction.

17. The article transport facility according to claim 11, wherein:
a cross section of the groove orthogonal to the traveling path direction has an arc shape with a central angle of less than 180°.

18. The article transport facility according to claim 11, wherein:

the intermediate plate segment is fixed to a reinforcement reinforcing the rail unit and has a surface in the first width direction being in contact with the reinforcement.

19. The article transport facility according to claim 11, wherein:

the rail unit further comprises a flange, the flange is a plate extending continuously in the traveling path direction and extending in the vertical direction, and the flange extends in the downward direction from an edge of the upper plate segment in the second width direction, and the flange has a guide surface to allow a guide wheel in the article transport vehicle to roll on the guide surface.

20. The article transport facility according to claim 11, wherein:

an arc-shaped curved portion as viewed in the traveling path direction is at a joint between the upper plate segment and the intermediate plate segment.

\* \* \* \* \*